(12) United States Patent
Hill, III et al.

(10) Patent No.: US 7,174,934 B2
(45) Date of Patent: Feb. 13, 2007

(54) SOLID RUBBER TIRE INCLUDING RELATIVELY HARD RUBBER LAYER AND RELATIVELY SOFT RUBBER LAYER

(75) Inventors: Giles A. Hill, III, 101 New Castle, Idabel, OK (US) 74745; Duane S. Birdsong, Idabel, OK (US)

(73) Assignee: Giles A. Hill, III, Idabel, OK (US)

( * ) Notice: Subject to any disclaimer, the term of this patent is extended or adjusted under 35 U.S.C. 154(b) by 47 days.

(21) Appl. No.: 10/636,354

(22) Filed: Aug. 7, 2003

(65) Prior Publication Data

US 2005/0028914 A1    Feb. 10, 2005

(51) Int. Cl.
*B60C 7/10* (2006.01)
*B60C 7/24* (2006.01)

(52) U.S. Cl. ............... 152/209.17; 152/302; 152/324

(58) Field of Classification Search ........ 152/300–303, 152/323–326, 209.17; 156/112, 113; 425/37
See application file for complete search history.

(56) References Cited

U.S. PATENT DOCUMENTS

| | | | | |
|---|---|---|---|---|
| 1,026,468 A | * | 5/1912 | Selzer | 152/324 |
| 1,312,491 A | * | 8/1919 | McClenathen | 156/112 |
| 1,328,632 A | * | 1/1920 | Kremer | 152/324 |
| 1,500,786 A | * | 7/1924 | Allen | 152/324 |
| 1,548,843 A | * | 8/1925 | Korn | 152/324 |
| 1,552,081 A | * | 9/1925 | Rett | 152/324 |
| 1,670,827 A | * | 5/1928 | Seiberling | 152/326 |
| 1,813,758 A | * | 7/1931 | Charles | 152/324 X |
| 1,877,988 A | * | 9/1932 | Schrank | 152/209.17 X |
| 4,877,071 A | * | 10/1989 | Tanigawa et al. | 152/302 X |

FOREIGN PATENT DOCUMENTS

CH    446 936    *    3/1968    ............... 152/324

* cited by examiner

*Primary Examiner*—Adrienne C. Johnstone
(74) *Attorney, Agent, or Firm*—Osha Liang LLP; John W. Montgomery

(57) ABSTRACT

A solid rubber tire for use on vehicles such as heavy construction equipment is provided with a plurality of layers of different hardness. One of the layers is relatively softer than the other layers and holes are formed at least partially into the tire to provide added flexibility and smoothness of ride to the solid rubber tire.

1 Claim, 3 Drawing Sheets

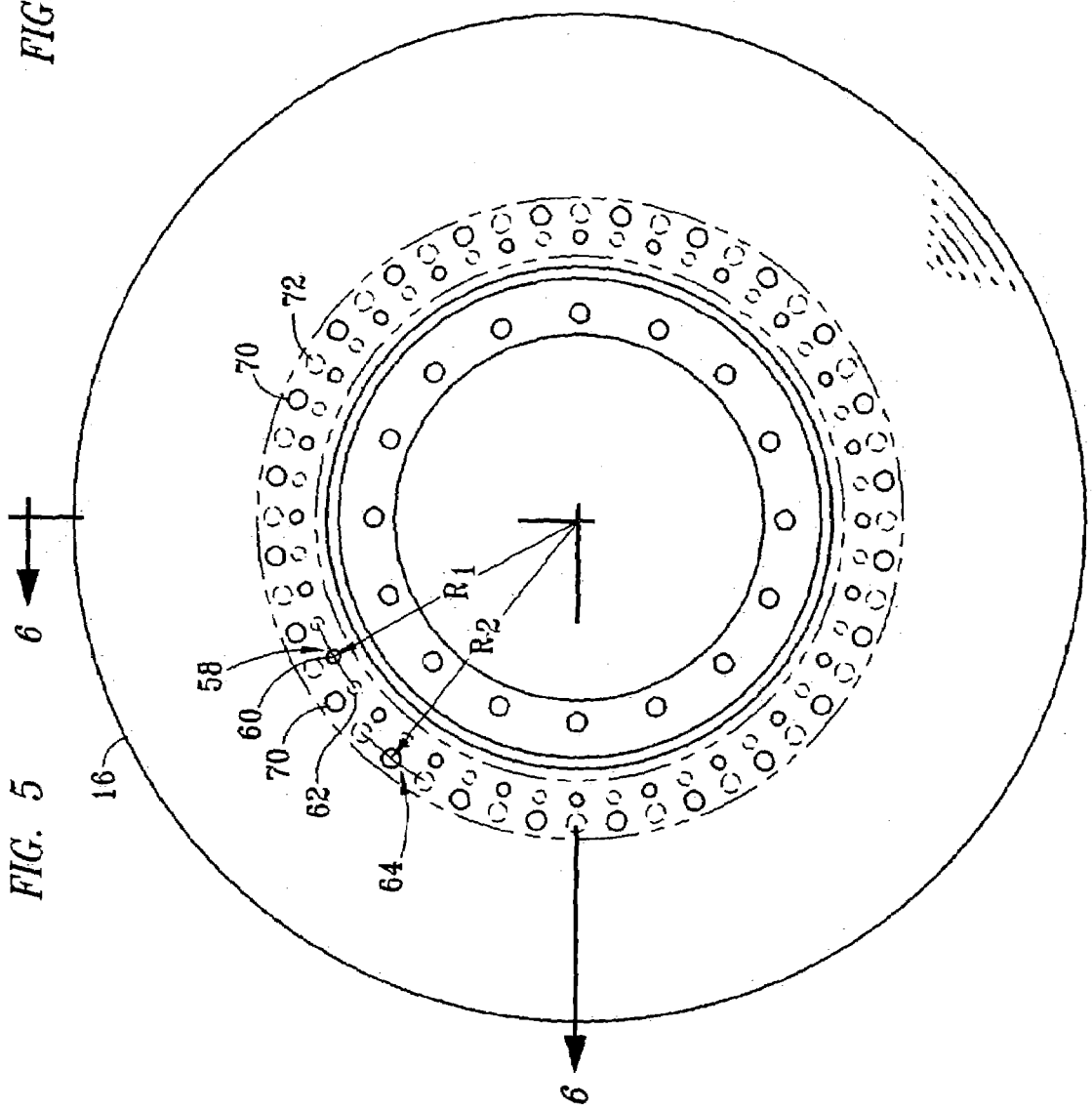
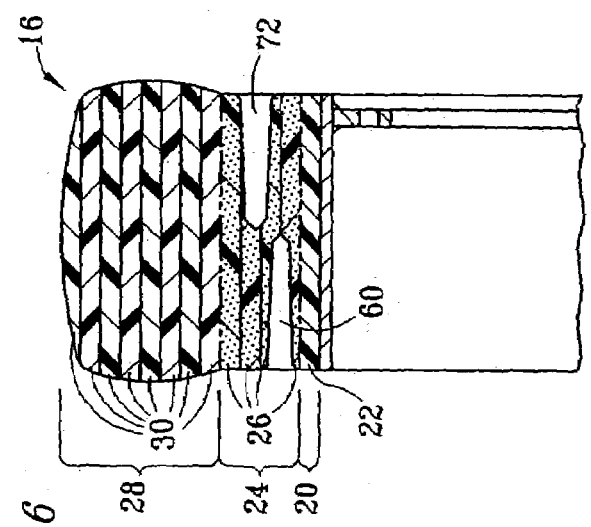
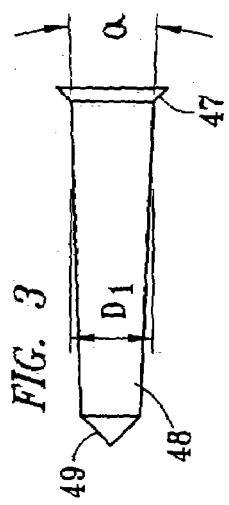
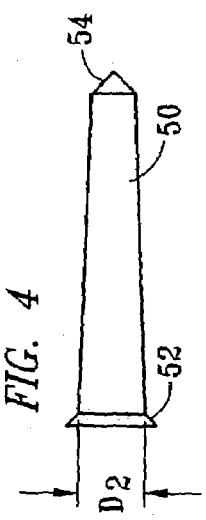

SOLID RUBBER TIRE INCLUDING RELATIVELY HARD RUBBER LAYER AND RELATIVELY SOFT RUBBER LAYER

FIELD OF INVENTION

The present invention relates to a solid rubber tire for a vehicle such as heavy construction equipment.

BACKGROUND OF THE INVENTION

Solid rubber tires have been used in the place of pneumatic tires for vehicles such as heavy construction equipment to reduce down time due to flat tires. There has been a long and unfulfilled need for improving the ride provided by solid rubber tires.

BRIEF SUMMARY

According to one embodiment of the invention a solid rubber tire is provided for use on vehicles such as heavy construction equipment and the like. The tire has a plurality of layers of different hardness. One of the layers is relatively softer than the other layers and holes are formed at least partially into the tire to provide added flexibility and smoothness of ride to the solid rubber tire.

BRIEF DESCRIPTION OF THE DRAWINGS

FIG. 3 is a side elevation view of one of a plurality of metal molding pins of one size and shape used to form holes into a solid rubber tire according to an embodiment of the invention.

FIG. 4 is a side elevation view of one of a plurality of metal molding pins of another size used to form holes into a solid rubber tire according to an embodiment of the invention.

FIG. 5 is a side elevation view of a wheel having a solid rubber tire formed thereon according to another embodiment of the invention.

FIG. 6 is a partial section view of the wheel and tire assembly of FIG. 5, taken along section line 6—6 of FIG. 5.

DETAILED DESCRIPTION

Figure 2:
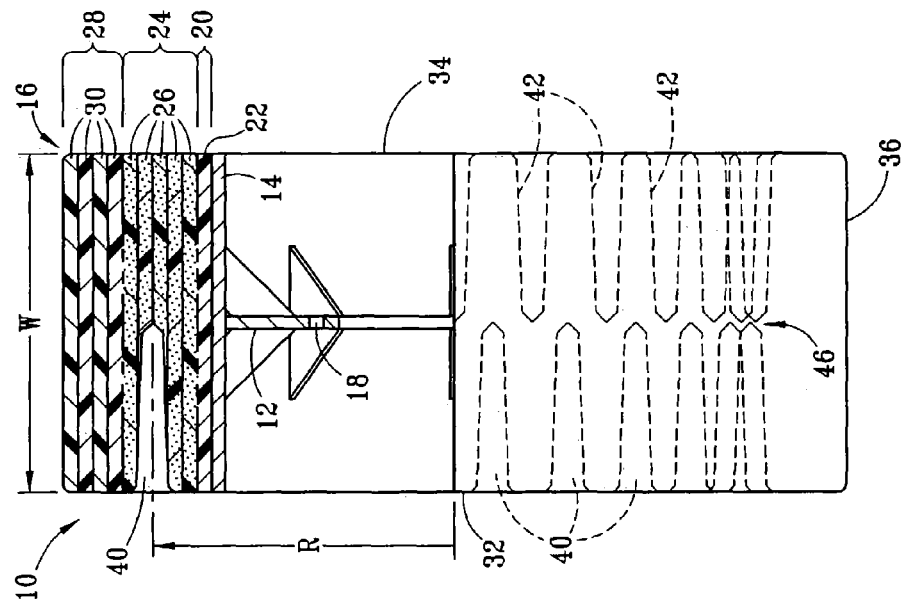
FIG. 2 is a front view of the of FIG. 1 with a partial section view taken along section line 2—2 of FIG. 1.
Figure 1:
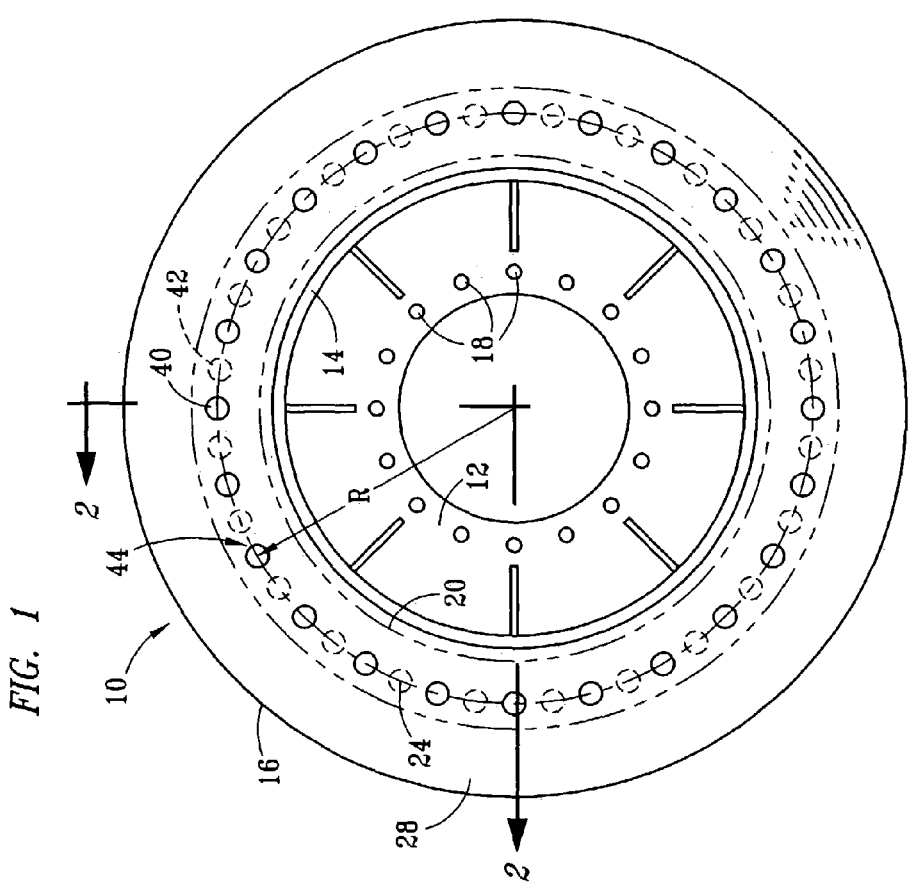
FIG. 1 is a side elevation view of a wheel having a solid rubber tire formed thereon according to one embodiment of the invention.

FIGS. 1 and 2 show a wheel and tire assembly 10 according to one embodiment of the invention including a metal hub 12 having a cylindrical rim 14 attached around the periphery of the hub 12 and a solid rubber tire 16 formed around the cylindrical rim 14. The hub 12 has a pattern of mounting holes 18 formed therein for mounting to an axle of a vehicle. The cylindrical rim 14 may have a width generally corresponding to the desired width W of the solid rubber tire 16. A bonding layer of rubber 20 is secured to the cylindrical rim 14 and may also have a width generally corresponding to the width W of the solid rubber tire 16. The bonding layer 20 may be formed of one or of a plurality of sub-layers 22 of raw rubber. By way of example, the raw rubber used to form the bonding layer 20 may be selected so that when the bonding layer 20 of rubber is vulcanized to cure it, the bonding layer 20 will have a hardness of between about 70 and 90 Durometer (on the Shore A scale). The bonding layer 20 functions to provide a strong connection between the metal rim 14 and the solid rubber tire 16 formed thereon.

Secured to the bonding layer 20 is a soft layer 24 of rubber, that may also have a width corresponding generally to the width W of the cylindrical rim 14 and the bonding layer 20. The soft layer 24 may be formed of a plurality of sub-layers 26 of raw rubber. By way of example, the raw rubber used to form the soft layer 24 may be selected so that it has a hardness throughout of between about 25 and 45 Durometer (on the Shore A scale) when cured. The soft layer 24 of rubber provides an amount of flexibility to the tire 16 depending upon its hardness and its total thickness. The soft layer 24 flexes more than other parts of the tire 16 because it is relatively softer that the other parts of the tire 16.

Secured to the soft layer 24 is a wear layer 28 of rubber, that may have a width corresponding generally to the width W of the tire 16. The wear layer 28 may be formed of a plurality of sub-layers 30 of raw rubber. By way of example, the raw rubber used to form the wear layer 28 may be selected so that when the wear layer 28 of a rubber is vulcanized to cure it, the wear layer 28 will have a hardness of between about 50 and 70 Durometer (on the Shore A scale). The wear layer 28 provides strength, durability and wear resistance to the tire 16. The wear layer 28 may also comprise wear resistant materials, fiber bias or reinforcing materials mixed within the rubber to provide additional strength, durability and wear resistance. In the event that a tread design is to be formed in the rolling surface of the tire 16, the tread design will be beneficially formed in the strong wear layer 28.

As an example of the details of the tire 16, the bonding layer of a rubber may have a thickness of about 2%–15% of the total tire thickness; the soft layer of rubber may have a layer thickness of about 20%–50% of the total tire thickness; and the wear layer of rubber may have thickness of about 40%–80% of the total tire thickness. In another embodiment, the tire 16 may have a total radial thickness of about 17 inches (about 43 cm), the bonding layer 20 is about ¾ of an inch thick (about 2 cm), the soft layer 24 is about 5 in. thick (about 13 cm) and the wear layer 28 is about 12 in. thick (about 30 cm). The bonding layer 20 has nominal hardness of 80 Durometer (Shore A), the soft layer 24 has a nominal hardness of 40 Durometer (Shore A) and the wear layer 28 has a nominal hardness of 60 Durometer (Shore A). It is understood that these dimensions and ranges of hardness are for example only and are not intended to place limitations on the invention other than as set forth in the claims.

The rubber layers, including the bonding layer 20, the soft layer 24 and the wear layer 28 are formed by wrapping sheets of raw rubber in a plurality of successive sub-layers 22, 26 and 30, respectively. The raw rubber of the sub-layers is selected having the indicated hardness and wrapped first around the metal wheel rim 14 and then around each successive sub-layer. An appropriate number of sub-layers 22, 26 and 30 of a given thickness provide the desired thicknesses of the bonding layer 20, the soft layer 24 and the wear layer 28, respectively. The hardnesses of the raw rubber for the various sub-layers 22, 26 and 30 are selected to provide the desired hardnesses of the different layers 20, 24 and 28 when cured.

The rubber tire 16 has opposite sides 32 and 34. The sidewalls 32 and 34 are generally parallel and flat, but may be convergent or divergent, and may be flat, concave, convex or a combination to provide a desired tire shape. The sides extend from the rim 14 to a generally cylindrical rolling contact surface 36. The rolling contact surface 36 may be flat or rounded or may have a smooth surface or may have a tread pattern formed therein.

To improve flexibility according the present inventions, a plurality of holes 40 are formed into at least one side 32. All of the plurality of holes 40 are placed at a desired radial distance R from the central axis of the wheel hub 12 and are spaced circumferentially in a ring pattern 44 completely around the side of the tire 16. The circumferential spacing may be substantially equal between each of the plurality holes. The radial distance R is selected so that the plurality of holes 40 are formed at least partially within the soft layer 24. To further increase the flexibility, the holes are formed entirely within the soft layer 24. To further improve flexibility of the tire 16, a plurality of holes 40 and 42 are formed into each side 32 and 34, respectively. The plurality of holes 40 and 42 extend from the respective sides 32 and 34, into the rubber tire 16. As with the plurality of holes 40, the plurality of holes 42 define a corresponding ring pattern 46 in side 34. The holes 42 are positioned at the same radial distance R from the center of the wheel hub 12, and are circumferentially offset from the ring pattern 44 by a distance of about one half the circumferential distance between each of the holes 40. The holes 40 and 42 are elongated in the axial direction. The circumferential offset avoids intersection between holes 40 and 42. The holes 40 and 42 are formed about halfway through the width W of the tire 16 and might extend more or less than halfway thought the width of the tire without intersecting.

Circular cross-sectional shaped holes 40 and 42 provide both rounded "corners" and also provide for convenient use of standard cost effective manufacturing techniques for molding the holes. Cylindrical, conical, frusto-conical, or a combination of such shapes have been found to work for this purpose. The ring pattern 44 of holes 40 formed into side 32 is offset from the ring pattern 46 of holes 42 formed into side 34. The holes 40 and 42 extend into the tire about half the width W of the tire from each side. Although the sets of holes 40 and 42 are offset from one another, together they effectively extend substantially across the entire width without intersecting. This provides for the benefit of additional flexure of the holes 40 and 42, entirely across the width W of the tire 16. A web 46 of solid rubber is provided between the internal ends of the holes 40 and 42.

To manufacture a tire 16, the wheel rim 14 is wrapped with the sub-layers 22, 26 and 30 of raw rubber to form the layers 20, 24 and 28 and the wheel rim 14 and the wrapped layers of raw rubber are placed into a mold. The mold has two parts that may be pressed together with the wheel rim and rubber layers inside. The mold is then heated in a vulcanizing environment for curing the rubber to form the rubber tire 16. The bonding layer 20 is bonded to the wheel rim 14 and all of the successive sub-layers and layers 24 and 28 are bonded and secured to each other under the heat and pressure of the vulcanization process. The mold defines the size, shape and details of the tire 16 and molds of different sizes and shapes are used to form tires of different sizes and shapes. The total volume of wrapped raw rubber is sufficient to completely filled or to over fill the closed mold when pressed together with the wheel and tire therein.

Referring to FIG. 3, the elongated shaped holes 40 and 42 are conveniently molded by securing a plurality of projections 48 to the inside of each half of the tire mold so that the projections 48 are arranged in the ring pattern desired. Each projection 48 may have a maximum cross-sectional dimension D1. A chamfer 47 and a bevel 49 may be formed on the ends of the projection 48 to help reduce the sharpness of corners and the possible stress rising effect of such sharp corners at either end of the resulting holes 40 and 42. When the mold halves are pressed together, the plurality of projections 48 are pressed axially in both directions into the opposed sides 32 and 34 of the raw rubber tire 16. The mold is heated with the rubber under pressure and cured with the projections embedded in the raw rubber thereby displacing the rubber and creating the holes 40 and 42 in the cured rubber tire 16. Excess rubber is squeezed out of the mold and trimmed away from the tire 16. The holes 40 and 42 remain after the cured tire 16 is removed from the mold.

Referring also to FIG. 4, a projection 50 is smaller than the projection 48 of FIG. 3. A plurality of the projections 50 may be used together with projections 48 or in place of projections 48 for molding a tire 16 as described above with respect to the projections 48. The smaller diameter, or smaller maximum cross-sectional dimension D2, of each projection 50 results in forming smaller holes 40 and 42, than would be formed with the larger maximum dimension D1 of each projection 48. A chamfer 52 and a bevel 54 may also be formed on the projection 50.

To facilitate extraction of the projections 48 and 50 from the molded tire 16, the projections 48 and 50 may be provided with a slight taper angle $\alpha$, at least partially along their length, to leave tapered conical or frusto-conical shaped holes 40 and 42. The holes 40 and 42, when formed with a slight taper, will provide substantially uniform flexure across the portion of the width of the tire 16 corresponding to the depth of the holes 40 and 42. For example only, a change in diameter of about ¼ inch (about 1 cm) along the entire length of the projections 48 and 50 provides a slight taper for mold extraction and results in molded holes having substantially uniform flexure.

The embodiment of FIGS. 5 and 6, is similar to the embodiment of FIGS. 1–4, except the thickness of the layers, and identical structure is referred to with the same reference numbers. According to FIGS. 5 and 6, the shape of the tire, the positioning of the holes and the hole structure are varied from that of FIGS. 1–4. A plurality of holes 60 and 62 are formed in a pattern 58 at a radius R1 from the axis of the tire 16. A plurality of holes 70 and 72 are formed in a pattern 64 at a radius R2. The holes 70 and 72 are larger than a plurality of holes 60 and 62 and all of the holes 60, 62, 70, and 72 are formed in the soft layer 24 for maximum flexibility. Holes 60 are offset from holes 70, on one side of the tire and holes 62 and 72, are offset from each other on the opposite side of the tire 16. The holes 60 and 72 are generally aligned axially, but are positioned at radially offset distances R1 and R2, respectively. The holes 62 and 70 are also generally aligned axially, but at radially offset distances R1 and R2, respectively. All of the holes 60, 62, 70, and 72 are radially spaced and sized so that they do not intersect with each other.

Figure 8:
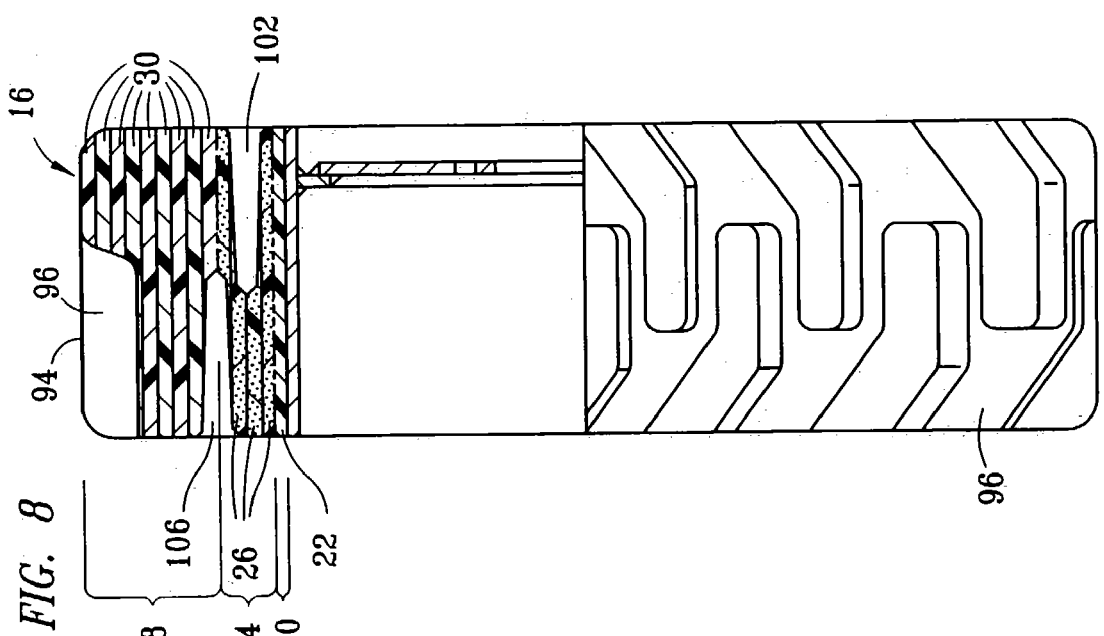
FIG. 8 is a partial section view of the wheel and tire assembly of FIG. 7, taken along section line 8—8 of FIG. 7.
Figure 7:
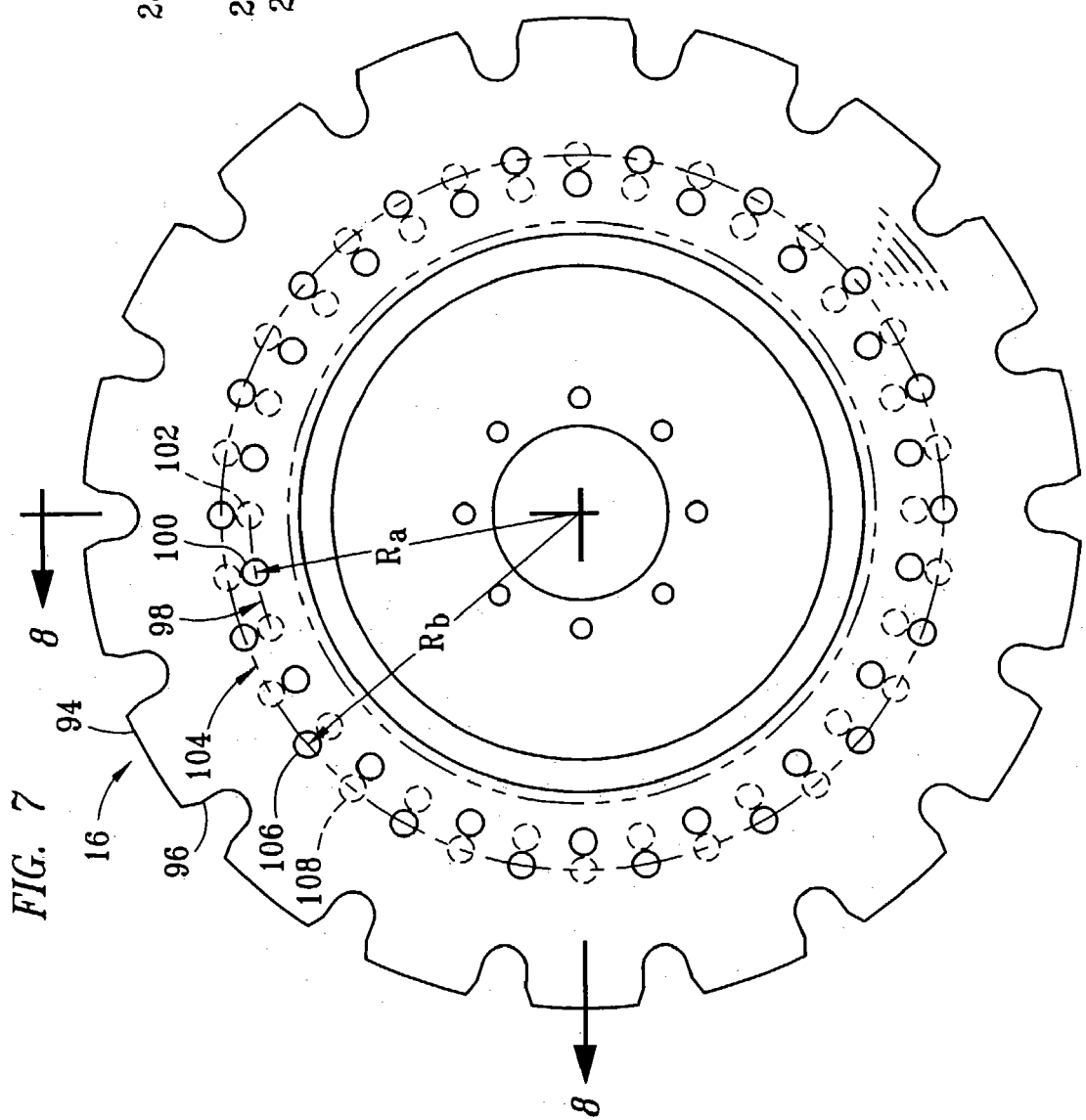
FIG. 7 is a side elevation view of a wheel having a solid rubber tire formed thereon according to another embodiment of the invention.

The embodiment of FIGS. 7 and 8, is similar to the embodiments of FIGS. 1–4, except the thickness of the layers, and identical structure is referred to with the same reference numbers. According to FIGS. 7 and 8, the shape of the tire, the positioning of the holes and the hole structure are varied from that of FIGS. 1–4. In this embodiment, the solid rubber tire 16 has a rolling surface 94 with a desired tread 96 formed therein. As with the other embodiments, a first ring pattern 98, of holes 100 and 102, is formed into opposed sides of the tire and positioned at a first radial distance Ra from the center of the wheel hub. A second ring pattern 104, of holes 106 and 108, is formed at a second radial distance Rb that is greater than the first radial distance Ra. The holes 100 and 102 and holes 106 and 108 are of approximately the same size. The holes 100 and 102 are formed entirely within the soft layer 24. To adjust the ride to a medium softness the holes 106 and 108 are formed partially in the soft layer 24 and partially in the wear layer 28. A larger portion of the holes 106 and 108 formed in the wear layer 28 produces less flexibility and a larger portion of the holes 106 and 108 formed in the soft layer 24 produces more flexibility. Thus, the flexibility can be adjusted by positioning the holes 106 and 108 in the different hardness layers 24 and 28.

The holes 100 and 108 will be generally aligned in the axial direction, but at radially offset distances Ra and Rb, respectively. The holes 102 and 106 will also be generally aligned axially, but at radially offset distances Ra and Rb respectively. The holes are radially spaced and sized and so that they do not intersect with each other.

VARIATIONS AND EQUIVALENTS

It is understood that variations may be made in the foregoing without departing from the scope of the invention. For example, terms with directional connotations such as base, top, upper, lower, outer, and inner are used in context for purposes of relative positions and the device need not be limited to absolute directions in order to fall within the scope of the invention described and claimed. While various features and embodiments are described in certain combinations and sub-combinations selected features from one embodiment may be combined with features of other embodiments without departing from certain aspects of the invention.

For example the metal hub 12 having a cylindrical rim 14 may be attached by acceptable mechanical connection or welding or may be integrally formed around the periphery of the wheel rim 12.

The layers of rubber are describe as formed with multiple sub-layers of raw rubber of different hardness but may be formed with unitary layers of different hardness rubber without departing from certain aspects of the invention. Also the rubber used may include reinforcing materials, fiber bias or other components materials mixed within the rubber to provide desired characteristics, such as strength, durability and wear resistance.

In some embodiments the rolling contact surface is variously shown as flat, rounded or with a tread. Other combinations and tread patterns may be used without departing from certain aspects of the invention. In the event that a tread design is to be formed in the rolling surface of the tire the tread pattern will be beneficially formed in the wear layer but need not be of any particular pattern The sides of the solid rubber tire are shown as generally parallel and flat, but may be convergent or divergent, and may be flat, slightly concave or convex to provide a desired tire shape.

The holes have been shown in various arrangements and with various specific ring patterns, but they might be formed in other arrangements and with a greater or a lesser number of total holes. The holes may be formed partially or entirely within the soft layer and other holes in other layers might also be formed without departing from certain aspects of the invention. The holes need not have equal circumferential spacing to provide certain aspects of the invention.

Variations of layer thickness and layer hardness may be provided without departing from certain aspects of the invention.

The overall flexibility and thus overall softness of the rolling ride can be adjusted either by changing the size of the holes, changing the number of holes or by positioning the holes either entirely within the soft layer, partially in the soft layer and partially in the wear layer, or entirely within the wear layer. The flexibility may be further adjusted depending upon the proportion of the holes in the soft layer compared to the proportion of the holes in the wear layer.

According to one embodiment a solid rubber tire is provided with at least a relatively soft layer of rubber material and a relatively hard layer of rubber material. A plurality of holes is formed into sidewalls of the tire.

According to one embodiment a solid rubber tire is provided with at least a relatively soft layer of rubber material and a relatively hard layer of rubber material. A plurality of holes is formed into at least one sidewall of the tire and at least a portion of the holes are formed into the soft layer.

According to another embodiment a solid rubber tire is provided with at least a relatively soft layer of rubber material and a relatively hard layer of rubber material. A plurality of holes is formed into at least one sidewall of the tire and at least a portion of the holes are formed into the hard layer.

According to another embodiment a solid rubber tire is provided with at least a relatively soft layer of rubber material and a relatively hard layer of rubber material. A plurality of holes is formed into at least one sidewall of the tire and some of the holes are formed into the soft layer and some of the holes are formed into the hard layer.

According to another embodiment a solid rubber tire is provided with at least a relatively soft layer of rubber material and a relatively hard layer of rubber material. A plurality of holes is formed into at least one sidewall of the tire and at least a portion of the holes are formed so that they are partially in the soft layer and partially in the hard layer.

According to another embodiment a solid rubber tire is provided with at least a relatively soft layer of rubber material and a relatively hard layer of rubber material, wherein each layer is formed by a plurality of radially spaced sub-layers and a plurality of holes is formed into at least one sidewall of the tire.

According to another embodiment a solid rubber tire is provided with at least a relatively soft layer of rubber material and a relatively hard layer of rubber material. A plurality of holes is formed into at least one sidewall of the tire and the holes have a depth less than the total width of the tire and extend substantially parallel to axis of the tire.

According to another embodiment a solid rubber tire is provided with at least a relatively soft layer of rubber material and a relatively hard layer of rubber material. A plurality of holes is formed into at least one sidewall of the tire and the holes are formed in a plurality of ring patterns.

According to another embodiment a solid rubber tire is provided with at least a relatively soft layer of rubber material and a relatively hard layer of rubber material. A plurality of holes is formed into at least one sidewall of the tire and the holes are formed in a plurality of ring patterns, the ring patterns having different radii.

According to another embodiment a solid rubber tire is provided with at least a relatively soft layer of rubber material and a relatively hard layer of rubber material. A plurality of holes is formed into at least one sidewall of the tire and the first and second sets of holes are radially spaced different distances from the axis of the tire.

According to another embodiment a solid rubber tire is provided with at least a relatively soft layer of rubber material and a relatively hard layer of rubber material. A plurality of holes is formed into at least one sidewall of the tire and at least a portion of the holes are formed in a first ring pattern and a portion of the holes are formed in an second ring pattern, the ring patterns having different radii.

According to another embodiment a solid rubber tire is provided with at least a relatively soft layer of rubber material and a relatively hard layer of rubber material. A plurality of holes is formed into at least one sidewall of the tire and the holes are formed in a plurality of ring patterns, the plurality of ring patterns having different radii.

According to another embodiment a solid rubber tire is provided with at least a relatively soft layer of rubber material and a relatively hard layer of rubber material, wherein first and second sets of holes are formed into both sidewalls of the tire.

According to another embodiment a solid rubber tire is provided with at least a bonding layer, an inner layer extending around the bonding layer, and an outer layer extending around the inner layer, the layers together forming two sidewalls, the layers having different hardnesses, and a plurality of holes formed into at least one sidewall.

According to another embodiment a solid rubber tire is provided with at least a bonding layer formed of one or more sub-layers bonded together and to an inner layer extending around the bonding layer, the inner layer formed of a plurality of sub-layers bonded together and bonded to the bonding layer and to an outer layer extending around the inner layer, the outer layer formed of one or more sub-layers, and the bonding layer, the inner layer and outer layer having different hardnesses and together forming two sidewalls of the tire. A plurality of holes are formed into at least one sidewall.

According to another embodiment a solid rubber tire is provided with at least a relatively soft inner layer of rubber material and a relatively hard outer layer of rubber material. A plurality of holes is formed into at least one sidewall of the tire and at least a portion of the holes are formed into the relatively soft inner layer.

According to another embodiment a solid rubber tire is provided with at least a relatively soft inner layer of rubber material and a relatively hard outer layer of rubber material. A plurality of holes is formed into at least one sidewall of the tire and at least a portion of the holes are formed at least partially in the relatively soft layer and at least a portion of the holes are formed at least partially in the relatively hard layer.

According to another embodiment a solid rubber tire is provided with at least a relatively soft inner layer of rubber material and a relatively hard outer layer of rubber material. A plurality of holes is formed into at least one sidewall of the tire and at least a portion of the holes are formed into the relatively hard outer layer.

According to another embodiment a solid rubber tire is provided with at least a relatively soft inner layer of rubber material and a relatively hard outer layer of rubber material. A plurality of holes is formed into at least one sidewall of the tire and the holes have a depth less than the total width of the tire and the depth running substantially parallel to axis of the tire.

According to another embodiment a solid rubber tire is provided with at least a relatively soft inner layer of rubber material and a relatively hard outer layer of rubber material. A plurality of holes is formed into at least one sidewall of the tire and the plurality of holes further include a first set of holes formed in a first ring pattern and a second set of holes formed in a second ring pattern radially spaced from the first ring pattern.

According to another embodiment a solid rubber tire is provided with at least a relatively soft inner layer of rubber material and a relatively hard outer layer of rubber material. A plurality of holes is formed into at least one sidewall of the tire and the first and second set of holes are radially spaced different distances from the axis of the tire.

According to another embodiment a solid rubber tire is provided with at least a bonding layer, an inner layer extending around the bonding layer, and an outer layer extending around the inner layer. Each layer is formed by one or more radially spaced sub-layers. The layers have different hardnesses. The layers together forming two sidewalls and a plurality of holes are formed into both sidewalls.

According to another embodiment a solid rubber tire is provided with at least a bonding layer, an inner layer extending around the bonding layer, and an outer layer extending around the inner layer, the layers together forming two sidewalls, the layers having different hardnesses, and a plurality of holes formed into at least one sidewall wherein.

While the shape of the holes and the projections used to form the holes is shown as generally cylindrical or conical, other shapes such as oblong, oval, square, rectangular, triangular, or other polygon cross-sectional shaped holes might be formed without departing from certain aspects of the invention. The axis of elongation for each of the elongated holes is depicted generally parallel to the axis of the and an angular orientation might also be used for special purposes without departing from certain aspects of the invention.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as claimed in the claims that follow and to which applicants may be entitled.

What is claimed is:

1. A solid rubber tire for securing to a wheel rim, the solid rubber tire, comprising:

a bonding layer of relatively hard rubber to be secured to the wheel rim;

a soft layer of rubber relatively softer than the bonding layer and secured to the bonding layer;

a wear layer of rubber relatively harder than the soft layer and secured to the soft layer, the layers forming sidewalls defining a width of the tire; and a plurality of holes formed into the sidewalls, the holes formed at least partially into the soft layer, and having a depth less than the total width of the tire and running substantially parallel to the axis of the tire, wherein the first set of holes are formed at a first radius from the axis of the tire and evenly spaced circumferentially around a first of the sidewalls of the tire and the second set of holes are formed at the first radius, evenly spaced circumferentially around a second sidewall of the tire and offset circumferentially from the first set of holes so that the first and second sets of holes do not intersect within the tire and wherein a third set of holes is formed at a second radius from the axis of the tire and equally spaced circumferentially around the first sidewall of the tire; and a fourth set of holes are formed at the second radius, evenly spaced circumferentially around the second sidewall of the tire and offset circumferentially from the third set of holes so that the third and fourth sets of holes do not intersect within the tire, wherein all of the first and second sets of holes are formed entirely in the soft layer of rubber and all of the third and fourth sets of holes are formed partially in the soft layer of rubber and partially in the wear layer of rubber.

* * * * *